Patented Apr. 21, 1931

1,801,535

UNITED STATES PATENT OFFICE

ROGER ADAMS AND CHARLES W. RODEWALD, OF URBANA, ILLINOIS, ASSIGNORS TO ABBOTT LABORATORIES, OF NORTH CHICAGO, ILLINOIS, A CORPORATION OF ILLINOIS

ARSONOPHENYL AMINO ALCOHOLS AND THE PROCESS OF MAKING THE SAME

No Drawing.      Application filed October 10, 1923. Serial No. 667,618.

Our invention relates to compounds of the general structure $$XHO_3As\text{-aryl-}NH\text{-}(CH_2)_YOH,$$

where X represents hydrogen or a metallic element, aryl represents a benzene ring or a substituted benzene ring, and Y represents a numeral, 1 or greater than 1.

The objects of the invention are to produce a series of substances useful in the treatment of syphilis, and especially of the tertiary stage; to provide a series of intermediates from which said substances may be prepared, and to provide an improved process for producing substances of this general character.

One mole of an arsanilic acid or substituted arsanilic acid is dissolved in water containing an alkali, and one mole of ω-halogen-alkyl halogen carbonate $(ZCOO(CH_2)_YZ'$, where Z and Z' are halogens, and Y is the numeral one or more) added in small portions with shaking. After the reaction is complete, the reaction mass is acidified, the solid filtered off, and recrystallized. This intermediate product which is a ω-halogen-alkyl arsonophenyl carbonate, is refluxed with an excess of alkali and acidified, whereupon the arsonophenyl amino alcohol precipitates; after filtration, it is obtained pure by recrystallization.

The intermediates ω-halogen-alkyl-arsonophenyl carbonate) as well as the amino alcohols shrink when heated and then melt with decomposition. This property causes the melting point to vary by several degrees depending on the speed with which the substances are heated. The temperatures given in the experimental part are corrected.

The amino alcohols produced are dissolved in aqueous alkali in order to obtain solutions for use.

Specific compounds of the series

1. *p-Arsonophenyl-aminoethanol.*—21.7 grams of p-arsanilic acid is dissolved in 200 c. c. of water containing 4 grams of sodium hydroxide. 14.2 grams (1 mole) of β-chloroethyl chlorocarbonate is added in small portions with vigorous shaking, keeping the temperature below 35° C. A voluminous precipitate separates during the reaction. The shaking is continued for ten minutes after all the chloroethyl chlorocarbonate has been added. Thirty c. c. of concentrated hydrochloric acid is added, the product filtered off and washed with water. After recrystallization from 30% acetic acid, the β-chloroethyl-(p-arsonophenyl)-carbamate is obtained in the form of long needles which do not melt on heating to 250° C. 16 grams β-chloroethyl-(p-arsonophenyl)-carbamate is refluxed for 4 hours with 50 c. c. of 20% sodium hydroxide and 50 c. c. of water. The solution is cooled and concentrated hydrochloric acid is added until it is barely acid to congo. The p-arsonophenyl-aminoethanol separates and is filtered off and crystallized from water. It melts with decomposition at about 171°–173° C.

The above described reactions may be represented as follows:

1. (p) $H_2O_3AsC_6H_4NH_2 + ClCOOCH_2CH_2Cl$
    →(p) $H_2O_3AsC_6H_4NHCOOCH_2CH_2Cl + HCl$
2. (p) $H_2O_3AsC_6H_4NHCOOCH_2CH_2Cl + NaOH$
    →(p) 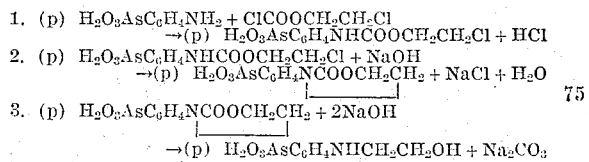 $+ NaCl + H_2O$
3. (p) 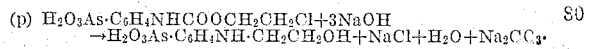 $+ 2NaOH$
    →(p) $H_2O_3AsC_6H_4NHCH_2CH_2OH + Na_2CO_3$ Equations 2 and 3 may be combined as follows:

(p) $H_2O_3As\text{-}C_6H_4NHCOOCH_2CH_2Cl + 3NaOH$
→$H_2O_3As\text{-}C_6H_4NH\text{-}CH_2CH_2OH + NaCl + H_2O + Na_2CO_3$.

2. *p-Arsonophenyl-aminopropanol.*—γ-chloro propyl-(p-arsonophenyl)-carbamate is prepared in a similar manner to that described for β-chloroethyl-p-arsonophenyl)-carbamate in Example 1.—21.7 grams p-arsanilic acid is dissolved in a solution of 150 c. c. water and 20 c. c. of 20% sodium hydroxide. To the cooled solution, 15.7 grams γ-chloropropyl chlorocarbonate is added in small portions, the temperature being kept below 30° C. After proceeding further as in Example 1, the product γ-chloropropyl-(p-arsonophenyl)-carbamate is obtained as needles which begin to darken at 235° C., and melt with decomposition at about 239°–240° C.

34 grams of this γ-chloropropyl-(p-arsonophenyl)-carbamate so produced is refluxed 4 hours with 100 c. c. of 20% sodium hydroxide and 100 c. c. of water. The solution is cooled and hydrochloric acid added until congo red just turns violet. The desired p-arsonophenylamino-propanol separates in fine colorless platelets, which are filtered off and washed with water, then recrystallized from water. The product melts with decomposition at about 167°–168° C.

The above described reactions may be represented as follows:

1. (p) $H_2O_3AsC_6H_4NH_2 + ClCOOCH_2CH_2CH_2Cl$
   $\rightarrow H_2O_3AsC_6H_4NHCOOCH_2CH_2CH_2Cl + HCl$
2. (p) $H_2O_3AsC_6H_4NHCOOCH_2CH_2CH_2Cl + NaOH$
   $\rightarrow$(p) $H_2O_3AsC_6H_4NCOOCH_2CH_2CH_2 + NaCl + H_2O$
3. (p) $H_2O_3AsC_6H_4NCOOCH_2CH_2CH_2 + 2NaOH$
   $\rightarrow$(p) $H_2O_3AsC_6H_4NHCH_2CH_2CH_2OH + Na_2CO_3$ 3. *o-Arsonophenyl-aminoethanol*

10.8 grams of o-arsanilic acid is dissolved in a solution of 100 c. c. of water and 10 c. c. of 20% sodium hydroxide solution. After cooling the solution to 20° C., 7.2 grams of β-chloro-ethyl-chlorocarbonate is added in small portions with vigorous shaking, keeping the temperature below 30° C. The product β-chloroethyl-(o-arsonophenyl)-carbamate separates as a dense white crystalline substance. The shaking is continued for a few minutes after the final addition of the chlorocarbonate. The solution is made strongly acid to congo, the product filtered off, washed with water and recrystallized from water containing a little acetic acid. It melts with decomposition at about 156°–157° C.

The o-arsonophenyl-aminoethanol is prepared by refluxing for 4 hours, 4.2 grams of β-chloroethyl-(o-arsonophenyl)-carbamate with 4.3 grams (6 moles) of potassium hydroxide in 50 c. c. of water. The solution is cooled, made barely acid to congo with concentrated hydrochloric acid, and the product which precipitates out is recrystallized from water. It melts with decomposition at about 145°–146° C.

4. *o-Arsonophenyl-aminopropanol*

γ-chloro-propyl-(o-arsonophenyl)-carbamate is prepared by dissolving 10.8 grams of o-arsanilic acid in a solution of 75 c. c. of water and 10 c. c. of 20% sodium hydroxide solution (1 mole) and after cooling to 20° C., 7.9 grams of γ-chloro-propyl-chlorocarbonate is added and the reaction carried out as in Example 3. The crystals of γ-chloropropyl-(o-arsonophenyl)-carbamate are needle-shaped and melt with decomposition at about 139°–140° C.

Two grams of the above product is refluxed for 4 hours with an excess of aqueous potassium hydroxide in ten percent solution. After cooling, hydrochloric acid is added until the reaction is barely acid to congo-paper, and the precipitated o-arsonophenyl-aminopropanol is filtered off and recrystalized from water. The colorless platelets melt with decomposition at about 84°–85° C.

5. *Arsonophenyl-4-methyl-3-aminoethanol*

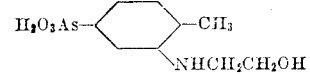

23.1 grams of 4-methyl, 3-aminophenyl-arsonic acid is dissolved in 200 c. c. of water containing 4 grams of sodium hydroxide. 14.2 grams of β-chloroethyl-chlorocarbonate is added in small portions with vigorous shaking, keeping the temperature below 30° C., and continuing the shaking for ten minutes after all the material has been added. The solution is made strongly acid to congo, and the product filtered off and washed with water. This product, 3-β-chloroethyl-(4-methyl, arsonophenyl)-carbamate after recrystallization from water containing a little acetic acid, melts with decomposition at about 194°–195° C.

17 grams of 3-β-chloroethyl-(4-methyl, arsonophenyl)-carbamate is refluxed for 4 hours with a solution of 50 c. c. of 20% sodium hydroxide and 50 c. c. of water. After cooling the solution, it is made barely acid to congo with concentrated hydrochloric acid. The product which is thereby precipitated is arsonophenyl-4-methyl-3-aminoethanol. It is filtered off and recrystallized from water, from which it comes out in the form of white needles which melt with decomposition at about 144°–145° C.

Having now described our invention, we claim:

1. As new products, the arsonophenyl amino alcohols of the general formula $$XHO_3As\text{-aryl-}NH(CH_2)_YOH$$

where X represents a hydrogen atom or a metallic element, aryl represents a benzene ring or substituted benzene ring, and Y is 1 or more than 1.

2. As new products the compounds of the general formula

where X represents a hydrogen atom or a metallic element, and Y is 1 or more than 1.

3. As a new product, the compound

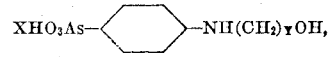

which is a white solid melting at 171°–173° C., and which forms salts with alkalis.

4. The improved step in the art of producing arsonophenyl amino alcohols which consists in treating an arsanilic acid with an alkali and a ω-halogen-alkyl halogen carbonate, acidifying and recrystallizing, treating with an alkali and then acidifying and recrystallizing.

5. The improved step in the art of producing arsonophenyl amino alcohols which consists in treating an arsanilic acid with an alkali and a ω-halogen-alkyl halogen carbonate, acidifying and recrystallizing, refluxing with an alkali and then acidifying and recrystallizing.

6. As a new product, an arsanilic acid compound in which an amino hydrogen of an arsanilic acid is replaced by $CH_2CH_2OH$.

ROGER ADAMS.
CHAS. W. RODEWALD.